US009521515B2

(12) United States Patent
Zimerman et al.

(10) Patent No.: US 9,521,515 B2
(45) Date of Patent: Dec. 13, 2016

(54) CONTENT REQUEST BY LOCATION

(71) Applicant: Mobli Technologies 2010 Ltd., Tel-Aviv (IL)

(72) Inventors: Gadi Zimerman, Hod-HaSharon (IL); Ido Sadeh, Ramat-Gan (IL)

(73) Assignee: Mobli Technologies 2010 Ltd., Tel-Aviv (IL)

( * ) Notice: Subject to any disclaimer, the term of this patent is extended or adjusted under 35 U.S.C. 154(b) by 0 days.

(21) Appl. No.: 14/805,489

(22) Filed: Jul. 22, 2015

(65) Prior Publication Data

US 2016/0219402 A1 Jul. 28, 2016

Related U.S. Application Data

(60) Provisional application No. 62/107,588, filed on Jan. 26, 2015.

(51) Int. Cl.
*H04W 4/02* (2009.01)
*H04W 4/00* (2009.01)

(52) U.S. Cl.
CPC .............. *H04W 4/021* (2013.01); *H04W 4/003* (2013.01)

(58) Field of Classification Search
CPC ............................... H04W 4/021; H04W 4/003
USPC .................... 455/456.3, 414.3, 3.06
See application file for complete search history.

(56) References Cited

U.S. PATENT DOCUMENTS

| | | | | |
|---|---|---|---|---|
| 6,834,195 B2* | 12/2004 | Brandenberg | ............ | G01S 5/02 340/539.11 |
| 8,285,199 B2* | 10/2012 | Hsu | ........................... | G06F 8/61 455/3.06 |
| 8,761,800 B2* | 6/2014 | Kuwahara | ............... | A63F 13/35 455/456.3 |
| 8,790,187 B2* | 7/2014 | Walker | .................... | G07F 17/32 463/1 |
| 2011/0066743 A1* | 3/2011 | Hurley | .................... | H04W 4/02 709/231 |
| 2014/0045530 A1* | 2/2014 | Gordon | .................. | G06Q 10/10 455/456.2 |
| 2014/0258405 A1* | 9/2014 | Perkin | .......................... | 709/204 |

* cited by examiner

*Primary Examiner* — Sharad Rampuria

(57) ABSTRACT

A method of obtaining media content of an event, comprising: identifying a real-life event and, a time of said real-life event a geographic location of the real-life event; identifying a subset of a plurality of client terminals of users located in proximity to the geographic location of the real-life event at said time of said real-life event; sending a message to the subset of client terminals containing a request to acquire media content documenting the real-life event; and receiving at least one media content item documenting the real-life event from at least one client terminal of the subset of client terminals, the at least one media content item acquired by at least one user of the users using the at least one client terminal in response to the message.

25 Claims, 4 Drawing Sheets

CONTENT REQUEST BY LOCATION

RELATED APPLICATION

This application claims the benefit of priority under 35 USC 119(e) of U.S. Provisional Patent Application No. 62/107,588 filed Jan. 26, 2015, the contents of which are incorporated herein by reference in their entirety.

FIELD AND BACKGROUND OF THE INVENTION

The present invention, in some embodiments thereof, relates to acquiring media content and, more particularly, but not exclusively, to acquiring media content by matching geographic locations of events and users.

People who are interested in media from a real-life event may search this media over the internet, for example in news websites, blogs etc. People may also view media content from an event when such media is posted by others who attended the event, for example in social network platforms. Many of these media content items are created and uploaded by users using mobile devices such as smartphones and/or tablet computers.

SUMMARY OF THE INVENTION

According to an aspect of some embodiments of the present invention, there is provided a method of obtaining media content of an event, comprising: identifying a real-life event, a time of the real-life event and a geographic location of the real-life event; identifying a subset of a plurality of client terminals of users located in proximity to the geographic location of the real-life event at the time of the real-life event; sending a message to the subset of client terminals containing a request to acquire media content documenting the real-life event; and receiving at least one media content item documenting the real-life event from at least one client terminal of the subset of client terminals, the at least one media content item acquired by at least one user of the users using the at least one client terminal in response to the message.

Optionally, the method further comprises: identifying a second subset of the plurality of client terminals of users potentially interested in the real-life event; and automatically providing the at least one media content item to the second subset of client terminals.

More optionally, the providing includes sending a message with a reference to a web document containing the at least one media content item.

Optionally, the method further comprises: providing the at least one media content item to at least one client terminal of the subset of client terminals of users potentially interested in the real-life event.

More optionally, the providing includes sending a message with a reference to a web document containing the at least one media content item.

Optionally, the identifying of the real-life event comprises: receiving a message from a first client terminal of the plurality of client terminals, the message containing a request from a user of the first client terminal to receive a media content documenting the real-life event.

More optionally, the method further comprises: providing the at least one media content item to the first client terminal.

Optionally, the identifying of the real-life event includes identifying a search action of the real-life event by a first client terminal of the plurality of client terminals.

More optionally, the method further comprises: providing the at least one media content item to the first client terminal.

Optionally, the identifying of the real-life event includes using an automatic algorithm connected to at least one events source.

Optionally, the identifying of the real-life event is done manually by entering event details into an event dataset.

Optionally, the method further comprises: sending a message with a reference to a web document containing the at least one media content item to at least one client terminal of the plurality of client terminals.

Optionally, the method further comprises: providing the at least one media content item to at least one third party to be presented by the third party in relation to the real-life event.

Optionally, the identifying of the subset of client terminals comprises: monitoring geographic locations of the plurality of client terminals; and automatically identifying when at least one of the plurality of client terminals is located in proximity to the geographic location of the real-life event.

Optionally, the identifying of the subset of client terminals includes accessing at least one calendar stored in a memory of at least one of the plurality of client terminals.

Optionally, the identifying includes ranking of the subset of client terminals according to past media content items received from each of the plurality of client terminals.

Optionally, the message includes instructions for acquiring the media content item.

Optionally, the message includes coordinates of the geographic location of the real-life event to be included in a map that indicates the geographic location and presented on a screen of each of the subset of client terminals.

Optionally, the message includes text instructions to arrive at a geographic location and/or coordinates of the geographic location of the real-life event to be included in a map that indicates the geographic location. The text instructions and the map are presented on a screen of each of the subset of client terminals.

More optionally, the map includes multiple identified geographic locations of real-life events.

Optionally, the message includes instructions for connecting the media content item to the real-life event.

Optionally, the at least one media content item is received by a message with a reference to a web document containing the at least one media content item.

Optionally, the at least one user is credited for acquiring the at least one media content item.

Optionally, the at least one media content item is aggregated with other media content items.

According to some embodiments of the invention, there is provided a computer readable medium comprising computer executable instructions adapted to perform the method.

According to an aspect of some embodiments of the present invention, there is provided a system for obtaining media content of an event, comprising: an event module that identifies a real-life event, a time of the real-life event and a geographic location of the real-life event; a tracking module that identifies a subset of a plurality of client terminals of users located in proximity to the geographic location of the real-life event at the time of the real-life event; and a communication module that: sends a message to the subset of client terminals containing a request to acquire media content documenting the real-life event; and receives at least one media content item documenting the real-life event from at least one client terminal of the subset of client terminals, the at least one media content item acquired by at least one user of the users using the at least one client terminal in response to the message.

Optionally, the method further comprises: an event dataset for storing the real-life event, the time of the real-life event and the geographic location of the real-life event.

Optionally, the method further comprises: a media dataset for storing the at least one media content item.

Optionally, the method further comprises: an aggregation module that aggregates the media content item with other media content items.

Optionally, the event module receives event details from an event algorithm that analyzes information from at least one events source.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
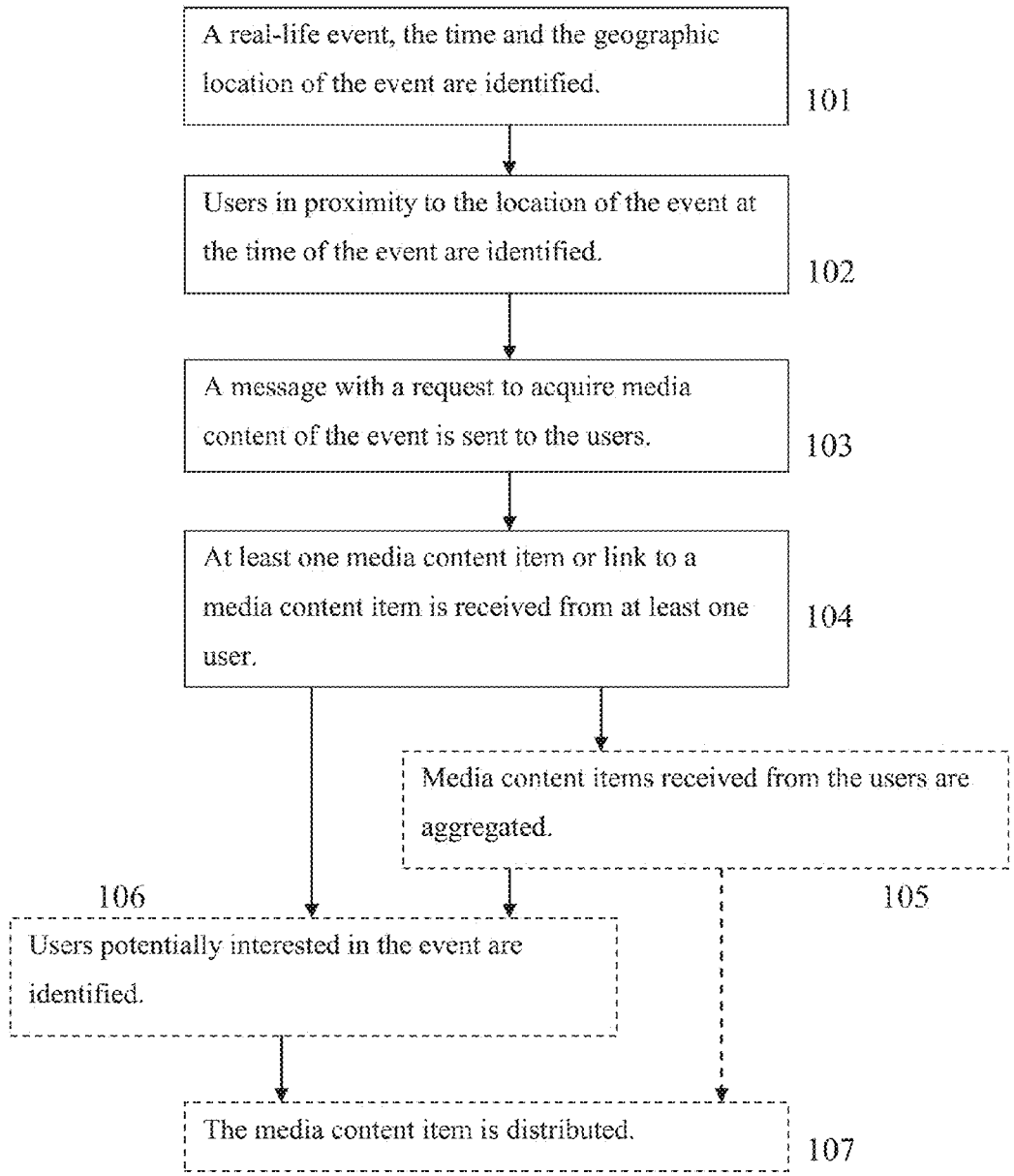
FIG. 1 is a flowchart schematically representing a method for obtaining media content documenting an event by requesting a user located in proximity to the event at the time of the event to acquire the media, according to some embodiments of the present invention.

The present invention, in some embodiments thereof, relates to acquiring media content and, more particularly, but not exclusively, to acquiring media content by matching geographic locations of events and users.

According to some embodiments of the present invention, there are provided methods and systems for acquiring media content, such as images, videos, voice recordings and/or text, documenting a real-life event such as a concert, a sport game or a demonstration, by requesting users who are in proximity to the event at the time of the event, to acquire the media content.

When the method is applied, a real-life event and geographic location are identified. This is done either by receiving requests from users interested in the event, automatically by an algorithm that scans multiple sources and/or manually. Client terminals of users in proximity to the geographic location of the event at the time of the event are identified, for example by a global positioning system (GPS) device of the client terminals. A message is then sent to the client terminals, containing a request to acquire media content documenting the event. The user may then respond by acquiring a media content item, for example take a photo of the event using the camera of his mobile phone, and upload it to the system. The media content items acquired by the users of the client terminals are then received by the system.

Optionally, the media content is then distributed, for example sent to the users who requested for the media content, sent to other users potentially interested in the event, posted online as part of other content relating to the event and/or provided to third parties.

The method allows users to act as momentary reporters and provide media content from their position, for example current position, knowing that their media content is requested, and may be viewed by multiple people and not just their friends. The method has the advantage of receiving media content in real-time, from events that may be unpredicted, remote and/or too obscure to send a reporter. Also, the method allows users to request media from events they are interested in. The media content documenting an event may be received from multiple users, therefore having the advantages of multi-perspective coverage of the event.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
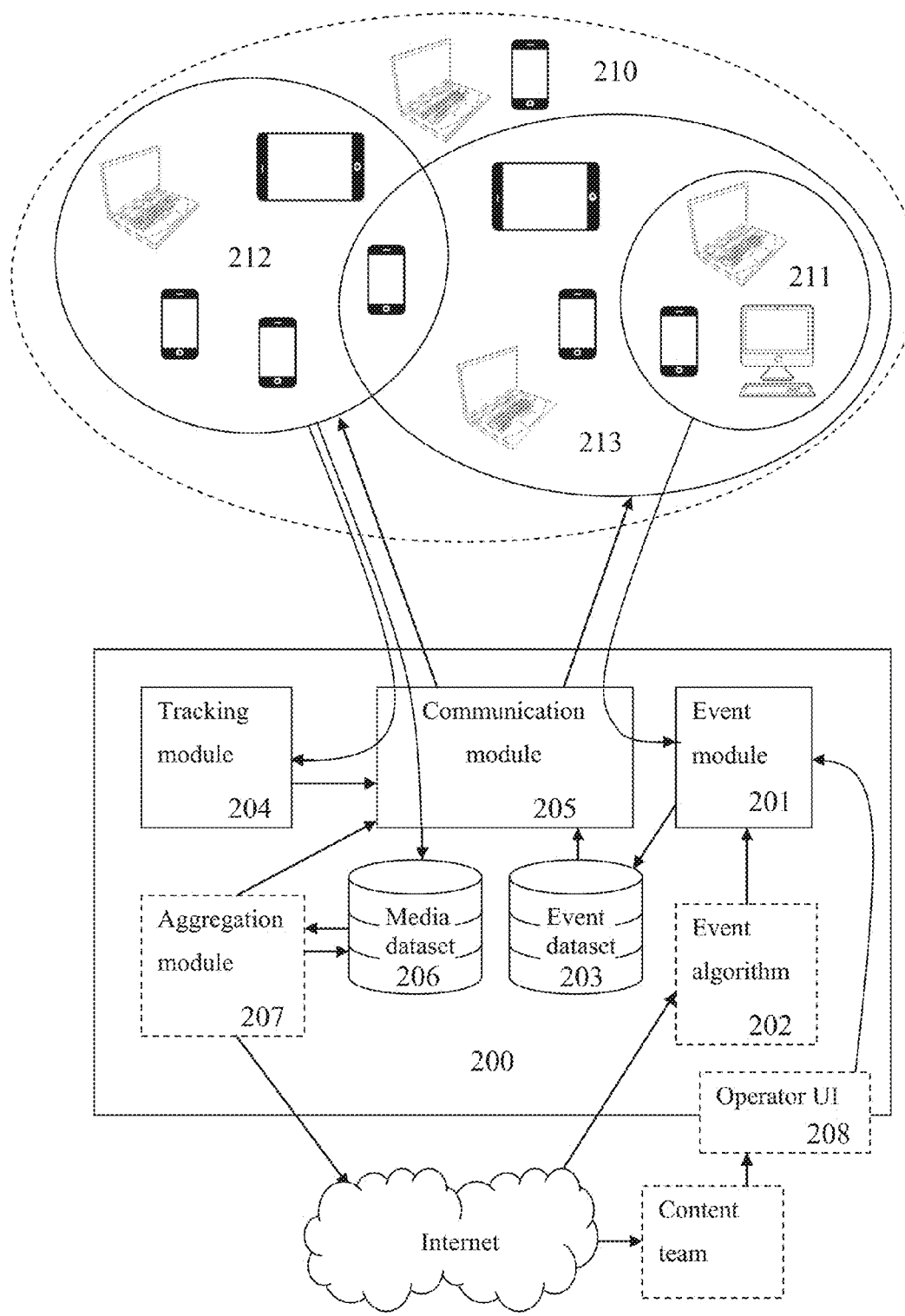
FIG. 2 is a schematic illustration of a system for obtaining media content documenting an event by requesting a user located in proximity to the event at the time of the event to acquire the media, according to some embodiments of the present invention.

Referring now to the drawings, FIG. 1 is a flowchart schematically representing a method of obtaining media content documenting an event by requesting a user located in proximity to the event at the time of the event to acquire the media, according to some embodiments of the present invention. Reference is also made to FIG. 2, which is a schematic illustration of a system of obtaining media content documenting an event by requesting a user located in proximity to the event at the time of the event to acquire the media, according to some embodiments of the present invention.

System 200 may include one or more computing devices, for example, a mainframe computer, an enterprise server, a workstation, multiple connected computers and/or a personal computer.

System 200 is connected via a network to multiple client terminals 210, each used by a user. The network may include, for example, local area network (WLAN), a wireless network such as mobile network, wireless local area network (WLAN) such as Wireless Fidelity (WiFi™), a wireless personal area network (WPAN) such as Bluetooth™ protocol and/or any other network.

Client terminals 210 may include, for example, a mobile device such as a Smartphone, a tablet, a wearable device such as Google glass, a Smart watch, a laptop computer and/or the like, a personal computer and/or any device that has one or more network communication modules, such as a network card or chip and runs a web-browser.

Each client terminal may include a program such as an App Store application or a Google Play application installed in the client terminal, a native operating system application and/or a browser add-on.

First, as shown in 101, a real-life event, the time of the event and the geographic location of the event are identified by an event module 201. The time of the event may be the current time for currently occurring events or may be a future time, for future events.

The real-life event may be, for example, a multi participant event such as a concert, a demonstration, a conference, and/or a sport game, a natural event such as a weather phenomena and/or an eclipse, and/or any other occasion or incident. The real-life event may also be general, for example, a city during a time period of a few months. The real-life event may be scheduled in advance or occurring as an outcome of circumstances, for instance a terror attack and/or a gathering of people induced by a presence of a celebrity, an artist and/or the like. For brevity, a real-life event may be referred to herein as an event.

Optionally, the event identification is done by receiving requests from a subset of client terminals 211 of client terminals 210 of users interested in receiving media content form the event. A user of one of client terminals 211 may perform a search for the event and/or may actively request for media content to be acquired. For example, a user is interested in seeing photos of a concert currently taking place. The request may include specific instruction, locations and/or items in the event. For example: "Please show the crowd roar after a goal in the game in Old Trafford". The request may be for a current event or for a future event. Optionally, the request may be a search action of the event by a user of one of client terminals 210. The search action may include, for example, the name of the event, the date or time of the event and/or any other detail related to the event.

Optionally, the request is indicative of specific information that should be included in the media content. Optionally, the specific information is of interest to a specific user of one of client terminals 211, for example to provide an answer to a specific question. For example, a request for an image of a nightclub or a queue to the post office, to indicate whether the place is currently crowded.

Optionally, a user who accesses a web document, such as a webpage displaying an article, an image, or a video (e.g. file or stream) about a held or a currently held event, is presented with a graphical user interface (GUI) that allows him to request for media content relating to the event.

Optionally, a request is received from an agent of a third party such as a news agency and/or a media company, for example via an application programming interface (API).

Optionally, the event identification is done by an automatic event algorithm 202. Automatic event algorithm 202 may use any source of information available on the internet and/or specialized sources, for example, databases of events, rich site summary (RSS), news websites, user-generated content such as social networks, forums and/or blogs, search engines, official websites (such as of bands and/or sport leagues) and/or any other source. Optionally, the event identification is done as described in U.S. Provisional Patent Application No. 62/007,974, filed on Jun. 5, 2014 which is incorporated here by reference.

Optionally, the event identification is done by manually providing events and their geographic location to event module 201, for example via an operator user interface (UI) 208. This may be performed, for example, by employees of a content team using operator UI 208. Content team may use any source of information as described above.

Optionally, an event is identified when potential use of media content documenting the event is identified, for example when the event is mentioned in news articles, event feeds, social media posts, chats and/or any combination thereof.

Optionally, an event is identified only after indication of interest from several sources, for example, multiple requests from client terminals 211, a request from one of client terminals 211 and also mentions in social networks and/or several mentions in news reports. For example, an event is not identified when media content documenting the event is requested by one user, however, when the event is also mentioned in a news web site, the event is identified.

Events identified by event module 201 may be stored in an event dataset 203.

Event dataset 203 may be any kind of structured data collection that allows access to stored data. Event dataset 203 may be stored, for example, in a digital data storage unit such as a magnetic drive and/or a solid state drive. Optionally, entries of events stored in event dataset 203 may be processed, for example by a merge algorithm that merges entries that were created as separate events but actually indicative of the same event.

Then, as shown in 102, a subset 212 of client terminals 210, which are used by users currently located in proximity to the geographic location of the event at the time of the event, is identified by a tracking module 204.

Optionally, client terminals 212 are identified by monitoring the geographic location of client terminals 210. The geographic location may be determined, for example, by a positioning system included in each of client terminals 210 such as global positioning system (GPS), triangulation of cellular network, Wireless Fidelity (WiFi™) network and/or any other locating method.

Optionally, users of client terminals 212 are ranked according to past uploads of media content. Optionally, users are identified as having better potential to respond to the request, for example, users who responded to requests in the past and/or uploaded media content to social networks are identified and ranked high. Optionally, users are identified as having better potential to produce quality uploads, for example according to quality of past uploads.

Optionally, users who are expected to be in proximity to the geographic location of the event at the time of the event are identified prior to the event, for example, by connecting to calendars stored on client terminals 210 and identifying future calendar events that are in geographic proximity and time proximity to the event.

Then, as shown in 103, a message is sent by a communication module 205 to client terminals 212. The message contains a request to acquire media content documenting the event. The message may be sent prior to the event and/or during the time of the event.

Communication module 205 may be, for example, a hardware element such as a network adapter card and/or a software module such as a computer program.

The media content may include, for example, images, videos, voice recordings, text and/or any other media. The message may be sent, for example, via a messaging service of an application installed on each of client terminals 212, mobile notification of the application, via short message service (SMS), an instant messaging (IM), an email and/or by any other communication method. The message may include specific instructions for acquiring the media content, for example, as indicated in the requests sent from client terminals 211 and/or according to other existing media content. For example, when most existing videos are taken from one angle, users are asked to take videos from a different angle.

Optionally, a map or textual instructions segment is presented in client terminals 212 to indicate the geographic location of the event. The textual instructions may be calculated automatically from map data, navigation application or API and/or taken from a database. The coordinates of said geographic location may be included in the message. Optionally, the message contains a request that includes instructions for locating the event, for example: "There is a demonstration 400m north of your location, Please show us what's going on". Optionally, the map includes multiple geographic locations of events for which media content is required.

Optionally, a chat is automatically established between the requestors and the user(s) who accept the request. For example, the chat is established as a group chat of an instant messaging platform and/or as an in application chat that is managed using a chat GUI as known in the art. This allows requestor to personally react to the uploaded content, optionally in real time, for example during a live feed of the content and/or immediately after the content is uploaded.

Then, as shown in 104, at least one media content item is received from at least one client terminal of client terminals 212 in response to the request message.

The media content item documenting the event and acquired by the user of the client terminal. The media content item may be acquired, for example, by sensors included in client terminals 212 such as built-in camera and/or recorder and/or by any other equipment. Optionally, media content items may be acquired by one device, such as a digital single-lens reflex camera (DSLR) and uploaded by a second device, such as a personal computer. Optionally, the media content item is received as a link to media content item uploaded to the internet, for example posted in a social network and/or personal blog.

Optionally, instructions are sent to users of client terminals 212 on how to connect the media content item to the right event, for example including suggested hash-tag(s) that could be used by a user to tag the media content item.

Optionally, media content items received from client terminals 212 are stored in a media dataset 206. Media dataset 206 may be any kind of structured data collection, as described above.

Then, optionally, as shown in 105, media content items received from client terminals 212 are aggregated by aggregation module 207. For example, a few images from the event are clustered, combined to create a collage, sorted to create a timeline of the event, sorted according to subject documented in the media items (for example artist, crowd, stage etc) and/or processed in any other way.

Then, optionally, as shown in 106, a subset 213 of client terminals 210, which are used by users potentially interested in the event, is identified. Client terminals 213 may include client terminals 211 of users that requested media content documenting the event and/or one or more of client terminals 212 which are in proximity to the event at the time of the event and may be interested in watching the event from a different angle or different interpretation. Optionally, client terminals 213 may also include one or more of client terminals 210 that are selected according to use patterns and are identified by an algorithm to identify users that were interested in this type of event in the past, for example according to visited websites, past requests, interests indicated by users for example in a configuration options and/or by any other method.

Then, optionally, as shown in 107, the media content is distributed by communication module 205, for example by messages. Optionally, the media content item is provided to client terminals 213 by a message which is sent by communication module 205 to client terminals 213, containing the media content item. The message may be any kind of message, as described above. Optionally, the media content item is provided by a message which contains a reference to a web document containing the media content. The web document that may be, for example, a webpage, an extensible markup language (XML) page, a hypertext markup language (HTML) page, a portable document format (PDF), an executable, an email, an audio and/or video file, an image and/or any other network accessible content file. The web document may be a webpage or any other network accessible destination. The web document may include, for example, a visual container that allows users to explore all the media content from the event. The reference to the web document may be, for example, a Uniform Resource Locator (URL) or a Universal Resource Identifier (URI). Optionally, the media content is distributed by an algorithm, for example an auto-article enrichment algorithm such as described in U.S. Provisional Patent Application No. 62/007,974. Optionally, a suggestion is sent to users of client terminals 213 to subscribe to media content documenting the event, for example by a hash-tag.

Optionally, the media content is distributed to third parties such as Media companies and/or news agencies. This may be implemented in a revenue share model. Optionally, payment is received from the third parties. Optionally, third parties are provided with access to media dataset 206, for example via an application programming interface (API).

Optionally, users are credited for uploading media content when requested.

For example, highly credited users are the first to receive media content documenting events and/or get priority when requesting media content. Optionally, users are paid when media content which they uploaded is sold to a third party.

Optionally, users are credited when media content which they uploaded is viewed, acknowledged and/or shared by others. Optionally, users are credited for accurately acquiring media content based on specific requests, for example, a show from a specific angle. Optionally, users requesting media content may initiate bidding for providing the required media content.

Optionally, the frequency of distributing the media content is adjusted, for example based on time, geographic location, other events and/or any other factor. For example, notifications to client terminals 213 may be frequent during the time of the event and less frequent when the event is over.

Optionally, the media content is distributed while new media is uploaded by client terminals 212 and is continuously aggregated by aggregation module 207.

Figure 3:
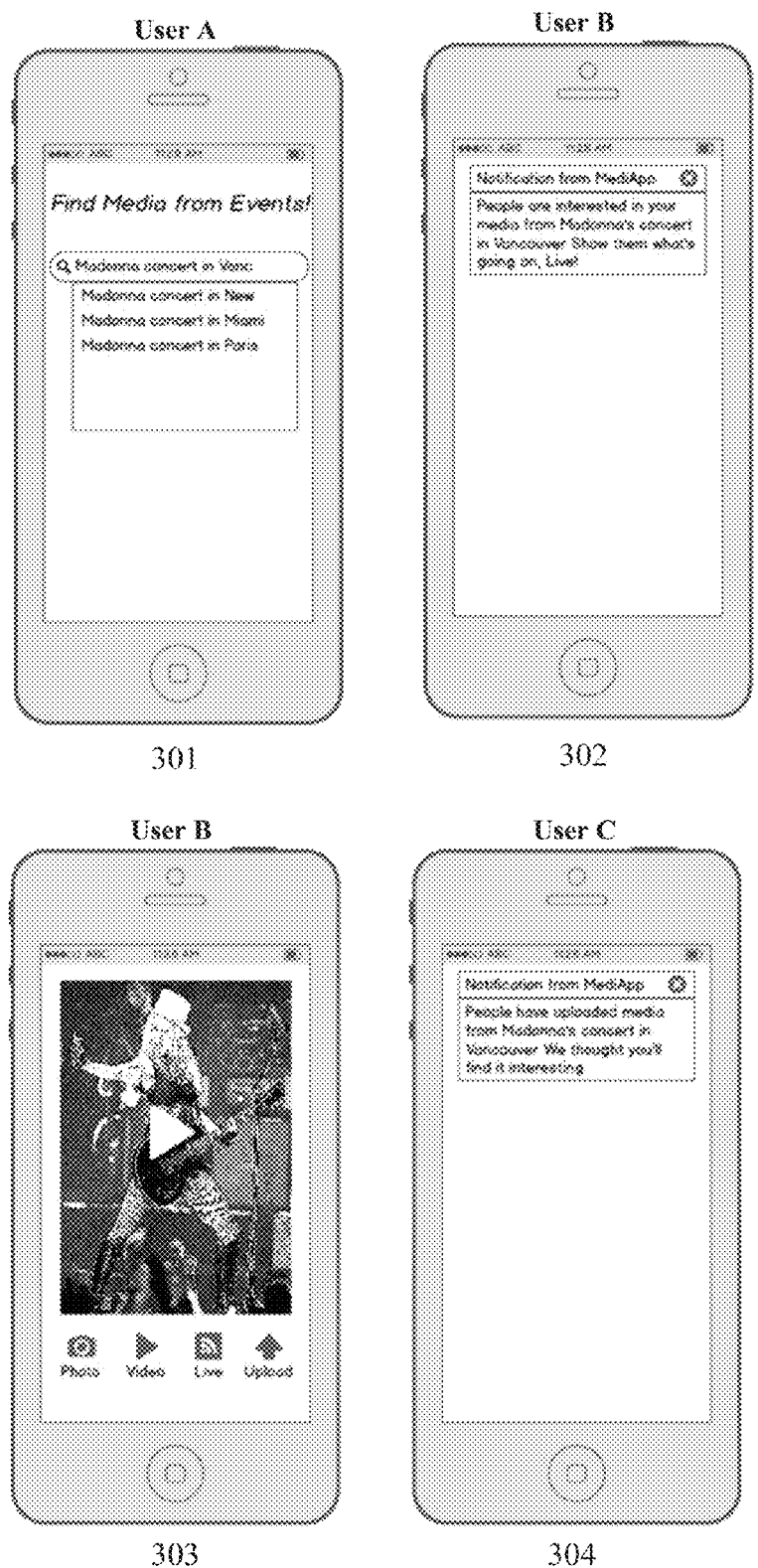
FIG. 3 is an exemplary application user interface (UI) of an application of obtaining media content documenting an event, according to some embodiments of the present invention.
Figure 4:
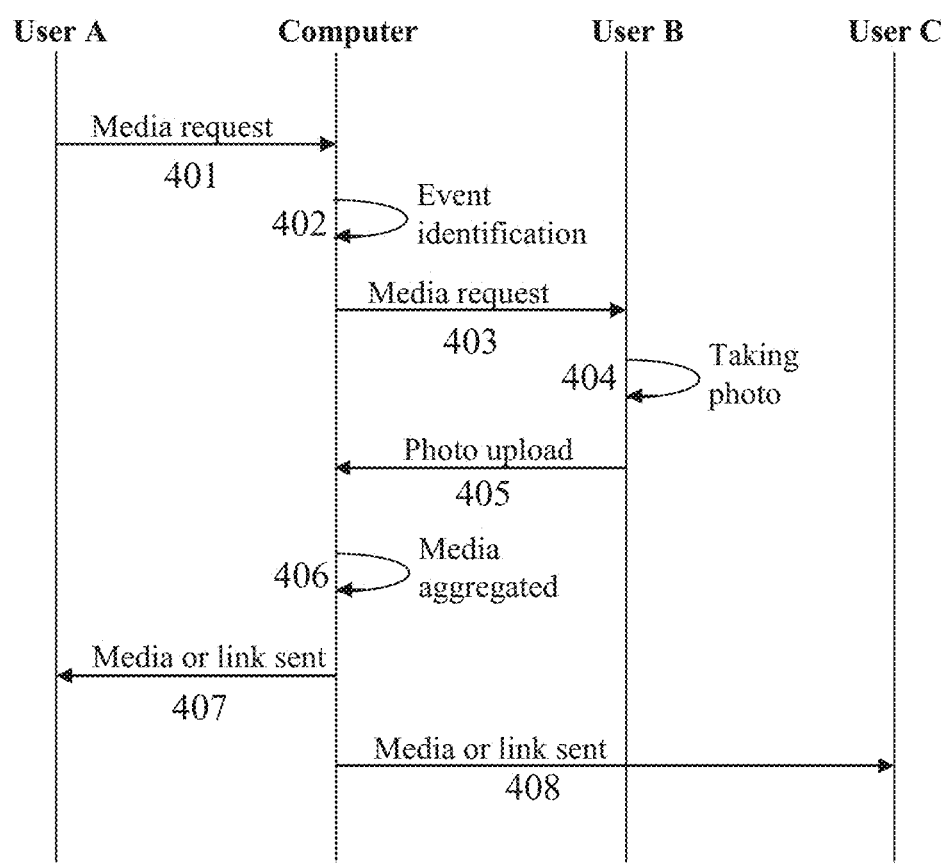
FIG. 4 is a sequence chart schematically representing an exemplary scenario of obtaining media content documenting an event, according to some embodiments of the present invention.

Reference is now made to FIG. 3, which is an exemplary application user interface (UI) of an application of obtaining media content documenting an event, according to some embodiments of the present invention. Reference is also made to FIG. 4, which is a sequence chart schematically representing an exemplary scenario of obtaining media content documenting an event, according to some embodiments of the present invention.

First, as shown in 301 and in 401, a user A of group 211 of the application is searching for media from the Madonna concert which is about to start in Vancouver, the system may suggest other popular searches from Madonna (such as from the last days). Since the concert has not started yet, very few (if any) media items are available.

Then, as shown in 402, the system then identifies that the Madonna concert in Vancouver is an interesting event, as a substantial number of users are querying on it.

The system identifies the time of the concert and which venue holds the concert, for example by using internet sources, and identifies the cellular polygonal perimeter that holds the venue.

Then, as shown in 403, the system sends a notification to users of group 212, which are within the polygonal perimeter, such as shown in 302 which is a screenshot of the application of user B of group 212, which invites people to share what they are viewing right now.

Then, as shown in 404, User B of group 212 takes a photo of Madonna in the concert. As shown in 303, the application allows for a quick upload screen for different type of media.

Then, as shown in 405, user B of group 212 uploads the photo of Madonna to the server of the system. Once the image is uploaded, it is aggregated together with other media uploaded from the Madonna concert in Vancouver, as shown in 406.

Finally, when enough media is gathered from users at the Madonna concert in Vancouver, a notification is send to users who have shown interest in that event (and others), such as user C of group 213 as shown in 304 and 407, and/or such as user A of group 211 who requested for the media, as shown in 408.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application, many relevant methods and systems for acquiring media content will be developed and the scope of the term media content is intended to include all such new technologies a priori.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of obtaining media content of an event, comprising:
automatically identifying a time and a geographic location of each of a plurality of real-life events by an analysis of at least one of: a plurality of files uploaded by a plurality of users and a plurality of crawled web documents using geographic information service;
documenting said time and said geographic location of each of said plurality of real-life events in an event dataset;
identifying an interest to receive a media content documenting a first of real-life event from said plurality of real-life events, said interest is detected by at least one terminal;
using data extracted from said event dataset for identifying a subset of a plurality of client terminals of said plurality of users, members of said subset are located in proximity to respective said geographic location of said first real-life event at respective said time of said first real-life event, said at least one terminal is not a member of said subset;
sending a message to each member of said subset of said plurality of client terminals containing instructions to present on a respective display on a request to acquire media content documenting said real-life event in said geographic location, said request comprising specific textual instructions for imaging at least one of a specific location and a specific item in said first event, said specific textual instructions are typed by one of said plurality of users; and
receiving at least one media content item sent from at least one member of said subset in response to said message, said at least one media content item is acquired using one of said plurality of client terminals and documents said real-life event, said at least one media content item acquired by at least one user of said plurality of users using said at least one member of said subset in response to said message;
making said at least one media content item available for access by said at least one terminal.

2. The method of claim 1, further comprising:
identifying a second subset of said plurality of client terminals of users potentially interested in said real-life event; and
automatically providing said at least one media content item to said second subset of client terminals.

3. The method of claim 2, wherein said providing includes sending a message with a reference to a web document containing said at least one media content item.

4. The method of claim 1, further comprising:
providing said at least one media content item to at least one client terminal of said subset of client terminals of users potentially interested in said real-life event.

5. The method of claim 4, wherein said providing includes sending a message with a reference to a web document containing said at least one media content item.

6. The method of claim 1, wherein said identifying of said real-life event includes identifying a search action of said real-life event by said at least one terminal.

7. The method of claim 1, wherein said identifying of said real-life event includes using an automatic algorithm connected to at least one events source.

8. The method of claim 1, wherein said identifying of said real-life event is done manually by entering event details into an event dataset.

9. The method of claim 1, further comprising:
sending a message with a reference to a web document containing said at least one media content item to at least one client terminal of said plurality of client terminals.

10. The method of claim 1, further comprising:
providing said at least one media content item to at least one third party to be presented by said third party in relation to said real-life event.

11. The method of claim 1, wherein said identifying of said subset of client terminals comprises:
monitoring geographic locations of said plurality of client terminals; and
automatically identifying when at least one of said plurality of client terminals is located in proximity to said geographic location of said real-life event.

12. The method of claim 1, wherein said identifying of said subset of client terminals includes accessing at least one calendar stored in a memory of at least one of said plurality of client terminals.

13. The method of claim 1, wherein said identifying includes ranking of said subset of client terminals according to past media content items received from each of said plurality of client terminals.

14. The method of claim 1, wherein said message includes at least one of text instructions to arrive at said geographic location and coordinates of said geographic location of said real-life event to be included in a map that indicates said geographic location; wherein said of text instruction and said map are presented on a screen of each of said subset of client terminals.

15. The method of claim 14, wherein said map includes multiple identified geographic locations of real-life events.

16. The method of claim 1, wherein said message includes instructions for connecting said media content item to said real-life event.

17. The method of claim 1, wherein said at least one media content item is received by a message with a reference to a web document containing said at least one media content item.

18. The method of claim 1, wherein said at least one user is credited for acquiring said at least one media content item.

19. The method of claim 1, wherein said at least one media content item is aggregated with other media content items.

20. A non transitory computer readable medium comprising computer executable instructions adapted to perform the method of claim 1.

21. A system for obtaining media content of an event, comprising:
at least one network interface;
a memory storing a code; and
a processor coupled to the memory and the at least one network interface for executing the stored code, the code comprising:
code instructions for automatically identifying a time and a geographic location of each of a plurality of real-life events by an analysis of at least one of: a plurality of files uploaded by a plurality of users and a plurality of crawled web documents using geographic information service;

code instructions for documenting said time and said geographic location of each of said plurality of real-life events in an event dataset;

code instructions for identifying an interest to receive a media content documenting a first of real-life event from said plurality of real-life events, said interest is detected by at least one terminal;

code instructions for identifying an interest to receive a media content documenting said real-life event, said interest is detected by at least one terminal;

code instructions for using data extracted from said event dataset for identifying a subset of a plurality of client terminals of a plurality of users, members of said subset are located in proximity to said geographic location of said real-life event at said time of said real-life event, said at least one terminal is not a member of said subset; and code instructions for instructing a transmission of a message to each member of said subset of said plurality of client terminals via said at least one network interface, said message containing instructions to present on a respective display a request to acquire media content documenting said real-life event, said request comprising specific textual instructions for imaging at least one of a specific location and a specific item in said first event, said specific textual instructions are typed by one of said plurality of users; and code instructions for receiving at least one media content item sent from at least one member of said subset in response to said message, said at least one media content item is acquired using one of said plurality of client terminals and documents said real-life event from at least one client terminal of said subset of client terminals, said at least one media content item acquired by at least one user of said plurality of users using said at least one member of said subset in response to said message; and code instructions for making said at least one media content item available for access by said at least one terminal.

22. The system of claim 21, further comprising:
an event dataset for storing said real-life event, said time of said real-life event and said geographic location of said real-life event.

23. The system of claim 21, further comprising:
a media dataset for storing said at least one media content item.

24. The system of claim 21, further comprising:
an aggregation module that aggregates said media content item with other media content items.

25. The system of claim 21, wherein said code further comprising code instructions which are executed by said at least processor for receiving event details from an event algorithm that analyzes information from at least one events source.

* * * * *